Figure 1:
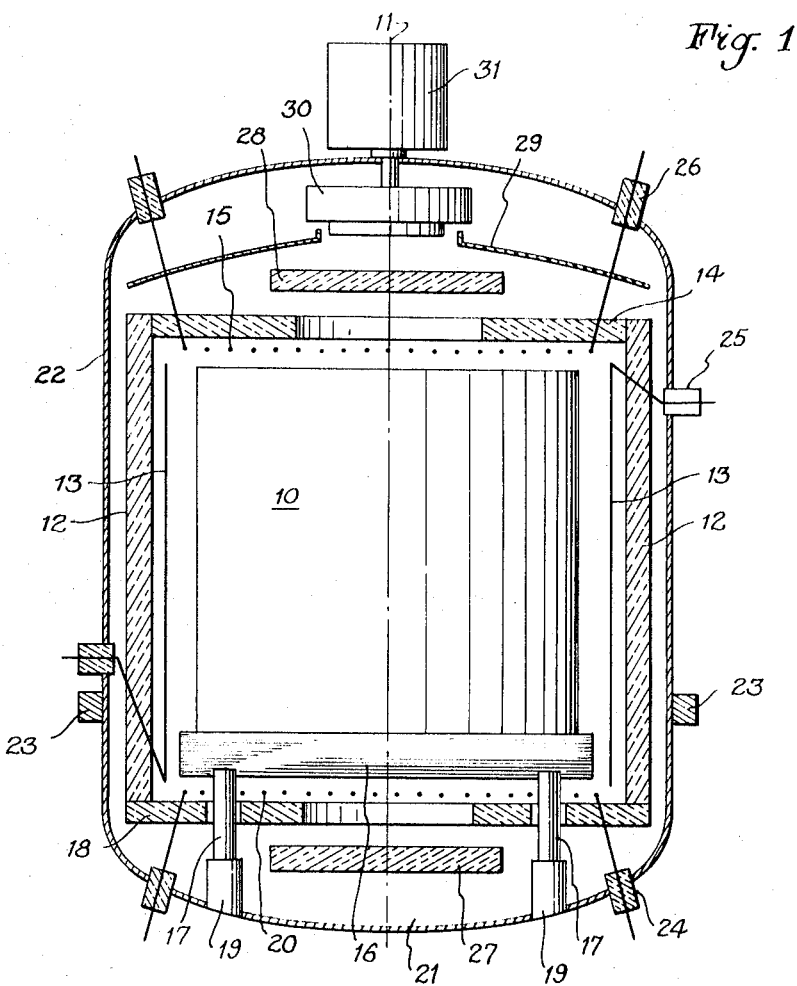

United States Patent

[11] 3,622,135

[72] Inventors: Fritz Bauer, Roth; Fritz Kalbfleisch, Lieblos; Fritz Krall, Hanau (Main), all of Germany
[21] Appl. No.: 863,306
[22] Filed: Oct. 2, 1969
[45] Patented: Nov. 23, 1971
[73] Assignee: Deutsch Gold- und Silber-Scheideanstalt Vormals Roessler, Frankfurt (Main), Germany
[32] Priority: Oct. 3, 1968
[33] Germany
[31] P 18 00 782.4

[54] VACUUM OVEN FOR EVENLY HEATING WORKPIECES
4 Claims, 2 Drawing Figs.

[52] U.S. Cl. .................................................. 263/40, 13/31

[51] Int. Cl. .................................................. F27b 3/02, F27b 5/04
[50] Field of Search .................................................. 13/31; 236/15 B; 263/40, 42, 52

[56] References Cited
UNITED STATES PATENTS

| 2,707,629 | 5/1955 | Kennedy | 263/52 X |
| 3,301,541 | 1/1967 | Ipsen | 263/40 R |
| 3,456,935 | 7/1969 | Bornor | 263/40 |

Primary Examiner—John J. Camby
Attorneys—Francis D. Stephens and Hugo Huettig, Jr.

ABSTRACT: A vacuum tank contains a chamber formed of heat-insulating walls on which the heating elements are mounted. A workpiece supported in said chamber is evenly heated by applying more heat at the bottom of the chamber to compensate for the heat loss due to the frame on which the workpiece is supported.

PATENTED NOV 23 1971 3,622,135

INVENTORS
Fritz Baur
Fritz Kalbfleisch
Fritz Krall

VACUUM OVEN FOR EVENLY HEATING WORKPIECES

This invention relates to a vacuum oven and in particular to a vacuum oven for evenly heating workpieces.

Special ovens are needed for brazing bulky workpieces which often have a multitude of brazing seams which are spaced over considerable distances as, for example, in a gas turbine housing and the work chamber of such oven should if possible have the same temperature at all points in the chamber. Deviations of only a few degrees Celsius can cause a complete waste of ordinarily very expensive workpieces. In other words, extraordinarily high requirements must be met with regard to an even distribution of temperature in a high vacuum brazing oven. The mere bulkiness of the workpieces as, for example, the size of a jet engine predetermines the size of the oven in which the working chamber is often from 1 to 2 meters in diameter and 1 to 2 meters high. A second requirement which has to be met in such a brazing oven is that the supporting frame for the workpiece must be very stable because any thermal distortion of the frame could cause unacceptable deformations in the workpiece because of its low stability with regard to shape as it is brought up to brazing temperature. Added to this is the fact that the supporting frame dissipates heat and thus reduces the temperature of the supporting frame especially when it is a metal frame. Other types of materials have been heretofore considered for constructing a brazing oven. While it is clearly apparent that ceramic materials with their heat-inhibiting characteristics would be preferred or at least considered for both the wall insulation and for the supporting frame itself, they are not completely acceptable because the water skins of ceramic materials diffuse very slowly in a vacuum. Consequently, up to the present, metal radiation shields have been ordinarily used for heat protection and a combination of metal and ceramic materials used for the supporting frame. In such a structure, it is apparent that it is impossible to construct an isothermal work chamber. Because of this, the brazing ovens heretofore used have their heating system solely in the oven housing and had a height which extended above and below the actual work zone in the oven. This is the only manner in which it was possible to equalize the heat loss due to the supporting structure construction by having the heat radiate into the working zone from the sides, even though this required the heating of a space that was much larger than the actual working zone in the chamber.

The object of this invention is to produce a vacuum oven for evenly heating workpieces in which an extremely stable and even temperature is obtained by heating all the surfaces surrounding the actual working zone in the chamber.

In general, the means by which the objects of this invention are obtained lies in the fact that the sidewalls and top of the working chamber are given the same amount of heat energy and that the bottom of the chamber is given an increased heating energy to compensate for the heat losses caused by the workpiece-supporting frame, and further dividing the heating system into three separate control circuits.

Figure 2:
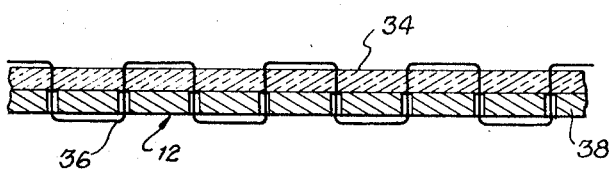

The means by which the objects of this invention are obtained are described more fully with reference to the accompanying schematic drawings in which:

FIG. 1 is a cross-sectional view of an oven constructed according to this invention; and FIG. 2 is an enlarged partial view through a heat-insulating wall used in the oven.

As shown in FIG. 1, the oven contains a cylindrical workpiece chamber 10 having a vertical axis 11. The chamber has a cylindrical heat-insulating sidewall 12 on which is mounted the electrical heating wires 13 evenly distributed across its entire circumferential surface. The top 14 supports the top electrical heating wire system 15. These two heating systems 13 and 15 provide the same amount of heating energy to the top and sides of the workpiece in the chamber. The workpiece which is to be brazed in chamber 10 is supported on a frame composed of narrow prism-shaped graphite beams 16 set on edge and parallel to each other. These beams are supported on graphite posts 17, the number of which depends upon the weight of the workpiece. Posts 17 extend through holes in the heat-insulated bottom 18 and outwardly of the chamber, and the posts are surrounded by sleeves 19 secured to the bottom 21 of the vacuum tank 22. The heating system 20 composed of electrical heating wires is supported on the bottom 18 in the same manner as for the top 14. Even though the thin posts 17 dissipate very little heat, nevertheless the heating system 20 is such that the heat losses caused by the supporting frame are compensated for. The amount of the heating energy in the heating system 20 is larger than that in the sidewalls and top in order to make up for heat losses for the supporting frame. Each of the heating systems 13, 15 and 20 is separately and adjustably controlled. A blower 31 is mounted on top of the tank for speeding up the cooling off of the working zone in chamber 10 after a protective gas has been introduced therein. The gas flows through openings in the top 14 and bottom 18. These openings are covered with baffles 27 and 28, respectively, which are wider than the openings so that, during the brazing process, no heat can radiate to the outside of the chamber 10 and when the blower 31 is actuated the gas flows through the spaces between the cover or bottom and its respective baffle. In a specific example, an oven was constructed which contained a working chamber 10 having a diameter of 1,500 mm. and a height of 1,500 mm. When a workpiece was heated in the chamber, widely spaced points on the workpiece showed temperature deviations of $\pm 2°$ C. This is at least in part due to the heat insulating walls of the chamber. The side 12, top 14 and bottom 18 were each constructed of a carbon felt sheet 34 which was sewed with graphite thread 36 to an expanded metal backing sheet 38. The wires in the heating system 13, 15 and 20 were composed of highly heatable molybdenum wire so that the wires, together with the carbon felt sheet, produced a structure of very little mass but extremely high thermal effect and a very low loss of heat.

Bottom portion 21 of the tank 22 is joined to the tank by a vacuumtight flange 23. The heating systems contained lead-in wires passing through vacuumtight seals 24, 25 and 26. A conventional vacuum pump was connected to the tank. In order to put the workpiece into chamber 10, the bottom portion 21 is separated from the top portion and in so doing either the top portion can be raised or the bottom portion lowered.

The carbon felt is made of carbon fibers in the same way as a felt sheet of natural or artificial fibers.

Having now described the means by which the objects of the invention are obtained,

We claim:

1. A vacuum brazing oven comprising a tank composed of an upper portion connected by vacuumtight flange means to a lower portion, heat-insulating means having sidewalls, a top and a bottom in said tank for forming a work chamber having a vertical axis, separate heating means mounted on each of said sidewalls, top and bottom facing the interior of said work chamber, beam means in said chamber for supporting a workpiece, and said heating means on said sidewalls and top being of equal heating capacity while said heating means for said bottom is of greater capacity to compensate for heat losses in said beam means.

2. An oven as in claim 1 in which said beam means comprises a plurality of prism-shaped graphite beams supported by thin graphite posts extending through said bottom.

3. An oven as in claim 1 in which said insulating means comprises carbon blankets sewed with graphite thread to a perforated metal backing sheet.

4. An oven as in claim 1 further comprising baffle-covered opening means in said top and said bottom for the free circulation of gas through said chamber.

* * * * *